(12) United States Patent
Paulisch et al.

(10) Patent No.: US 8,606,812 B2
(45) Date of Patent: Dec. 10, 2013

(54) INTELLIGENT SEARCH

(75) Inventors: Vanessa Paulisch, München (DE); Stephanie Rauch, München (DE)

(73) Assignees: Vanessa Paulisch, Munich (DE); Stephanie Rauch, Munich (DE)

( * ) Notice: Subject to any disclaimer, the term of this patent is extended or adjusted under 35 U.S.C. 154(b) by 0 days.

(21) Appl. No.: 13/543,925

(22) Filed: Jul. 9, 2012

(65) Prior Publication Data

US 2013/0013638 A1 Jan. 10, 2013

Related U.S. Application Data

(60) Provisional application No. 61/505,554, filed on Jul. 8, 2011.

(51) Int. Cl.
*G06F 17/30* (2006.01)

(52) U.S. Cl.
USPC ........... 707/769; 707/790; 707/791; 707/793; 707/803; 707/705; 709/201; 709/203; 709/213; 709/217

(58) Field of Classification Search
USPC ......... 707/769, 790, 791, 793, 803, 705, 201, 707/203, 213, 217
See application file for complete search history.

(56) References Cited

U.S. PATENT DOCUMENTS

| 7,248,168 | B2 * | 7/2007 | Muehl et al. ............... 340/572.4 |
| 7,752,143 | B2 * | 7/2010 | Frederick ..................... 705/333 |
| 8,200,669 | B1 * | 6/2012 | Iampietro et al. ............ 707/737 |
| 2002/0077930 | A1 * | 6/2002 | Trubey et al. .................. 705/26 |
| 2003/0158795 | A1 * | 8/2003 | Markham et al. ............... 705/28 |
| 2007/0169155 | A1 * | 7/2007 | Pasquale et al. ................ 725/81 |
| 2008/0015882 | A1 * | 1/2008 | Frederick ......................... 705/1 |

\* cited by examiner

*Primary Examiner* — Frantz Coby

(74) *Attorney, Agent, or Firm* — Occhiuti & Rohlicek LLP

(57) ABSTRACT

A method includes loading at least two databases in a server, a first database including smart tags referred to as stags and a second database including searchable content, enabling a user to generate one or more searches using the stags, each of the stags including at least one or more what components, an equal number of or a single where component, a single how component, several where components and a single how component, or several how components that are linked with another how component, and descriptive metadata and usage data, converting the stags with an interpreting engine into a search query, maintaining in a stag management engine the stag and usage data, generating data from third party databases to rank stags in a graphical user interface, and generating a list of matching results of database records and stags depending on a user selection.

20 Claims, 8 Drawing Sheets

INTELLIGENT SEARCH

CROSS-REFERENCE TO RELATED APPLICATIONS

This application claims priority to U.S. Provisional Patent Application Ser. No. 61/505,554, entitled "Intelligent Search," filed Jul. 8, 2011, which is incorporated herein by reference in its entirety.

BACKGROUND OF THE INVENTION

The present invention relates to database search, and more particularly to intelligent search.

In general, a search engine is software that searches for data based on some criteria. This data often resides in databases residing on Web servers, but search techniques similar to search engines may be used in databases residing on local servers. Every Web search engine site uses a search engine that it has either developed itself or has purchased from a third party. Search engines can differ dramatically in the way they find and index material on the Web, and the way they search the indexes from the user's query.

In conventional techniques, search engines use pattern matching methodologies and the web contents are searched by matching user given words. This surface matching technique generates results in millions and billions and most of the time irrelative and unrelated results are shown.

What is needed to increase the relevance of any search is a semantic search, wherein bits of information are categorized and tagged according to their relationship with other data.

Traditional expert systems are designed for centralized and controlled environments with clear taxonomies either controlled and maintained by respected authorities or otherwise generally accepted. They are bipartite models based upon concepts and instances. The ontologies created in such domains as chemistry, medicine or engineering are highly controlled and managed and require experts rather than ignorant users to query them. Such ontologies only work in certain domains due to the many ambiguities of the language. The word "card" may mean something completely different for a poker player and a computer expert.

On the other end, in the past decade very loosely defined, lightweight ontology systems have been formed in the world wide web which are mostly based upon some form of the "friend of a friend" (FOAF) principle. Such systems are in a way tripartite semantic systems extending the bipartite classical semantic system of concepts and instances by the third dimension of the user or actor. In such systems a user buying a book at Amazon® will be presented by a number of choices other customers made who bought the same book. Google®'s and Facebook®'s collections of personal data are designed to capitalize on such FOAF data. Such lightweight ontologies require the social engagement of the users and are often referred to as folksonomies (from folks and taxonomies). However, they have little or no formal structure and hence have a low specificity. Formally, such systems as used by delicious.com, Flickr®, and so forth, cannot be considered as vocabularies, the simplest possible form of an ontology on the continuous scale of Smith and Welty.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for intelligent search.

In one aspect, the invention features a method including, in a network of interconnected computers, loading at least two databases in a server, a first database including smart tags referred to as stags and a second database including searchable content, enabling a user to generate one or more searches using the stags, each of the stags including at least one or more what components, an equal number of or a single where component, a single how component, several where components and a single how component, or several how components that are linked with another how component, and descriptive metadata and usage data, converting the stags with an interpreting engine into a search query, maintaining in a stag management engine the stag and usage data, generating data from third party databases to rank stags in a graphical user interface, and generating a list of matching results of database records and stags depending on a user selection.

The present invention uses stags, a name derived from "smart" and "tags." Each stag includes 0-N "what" components, 0-N "where" components, 0-N "how" components, a name, an owner, descriptive metadata, and data to measure the usefulness of the stag. Stags can be of a what class, a where class, or a how class. Components in stags can reference other stags of the same or other authors enabling building complex stag networks with contributions from a large number of authors.

The present invention covers a middle ground between the highly formalized expert systems with unambiguous taxonomies and the lightweight folksonomies. The present invention enables the generation of an intentionally ambiguous taxonomy coupled with the intelligence of the social network, making it a self-learning system.

Other features and advantages of the invention are apparent from the following description, and from the claims.

BRIEF DESCRIPTION OF THE DRAWINGS

The invention will be more fully understood by reference to the detailed description, in conjunction with the following figures, wherein.

DETAILED DESCRIPTION

Figure 1:
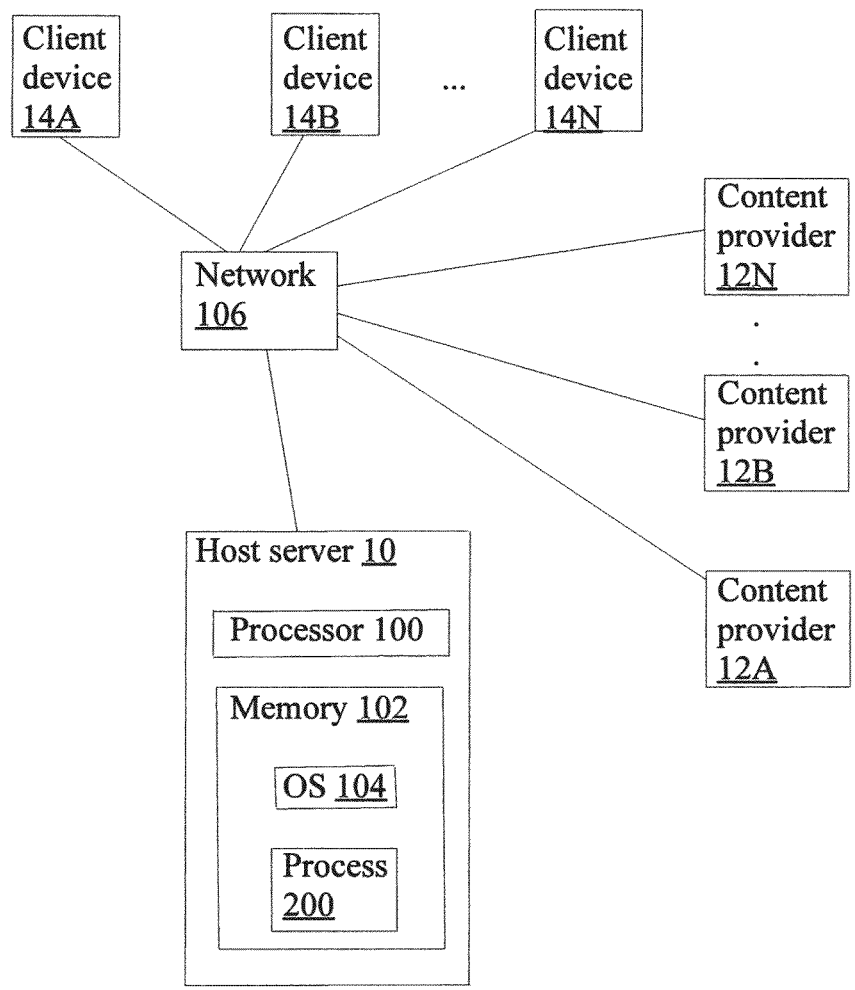
FIG. 1 is a block diagram.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Embodiments of the present disclosure include systems and methods for generating user-customized search results and building a semantics-enhanced search engine.

The techniques described herein generally relate to the search and the search optimization of electronic content including but not limited to electronic content that is distributed throughout the Internet or World Wide Web.

FIG. 1 illustrates an example block diagram of a host server 10 that performs techniques of search and search optimization of content from various content providers 12A-N to users of client devices 14A-N through a network 106. Content residing with the content providers 12A-N typically resides in one or more structured or unstructured databases. Content can include software, descriptive data, images, system information, drivers, and/or any other data. The content may be managed by a database management system (DBMS), for example but not limited to, Oracle®, DB2®, Microsoft Access®, Microsoft SQL Server®, PostgreSQL®, MySQL®, FileMaker®, and so forth.

The client devices 14A-N can be any system and/or device, and/or any combination of devices/systems that is able to establish a connection with another device, a server and/or other systems. Client devices 14A-N each typically include a display and/or other output functionalities and data exchanged between and among the devices 14A-N and the host server 10. For example, the client devices 14A-N can be any of, but are not limited to, a server desktop, a desktop computer, a computer cluster, or portable devices including, a notebook, a laptop computer, a handheld computer, a palmtop computer, a mobile phone, a cell phone, a smart phone, a personal data assistant (PDA), a Blackberry® device, an iPhone®, and so forth. In one embodiment, the client devices 14A-N and content providers 12A-N of electronic content are coupled to a network 106. In some embodiments, the devices 14A-N and host server 10 may be directly connected to one another.

In one embodiment, the host server 10 includes a processor 100 and a memory 102. The memory 102 includes an operating system 104 and an intelligent search process 200. The intelligent search process 200 can include a semantics-enhanced search that identifies and/or further categorizes web pages or other objects as having content of or being related specific semantic types. Further, intelligent search process 200 can categorize/identify objects as having content or content related to certain attributes of semantic types. In one embodiment, the intelligent search process 200 generates user-customized search results using user-defined semantic types.

The client devices 14A-N are generally operable to provide user access (e.g., visible access, audible access) to the search process, the user-customized search process, and the optimized search (e.g., via semantics), for example via a user interface displayed on the client devices 14A-N.

The network 106, over which the client devices 14A-N and the host server 10 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, and so forth.

The network 106 can be any collection of distinct networks operating wholly or partially in conjunction to provide connectivity to the client devices 14A-N and the host server 10 and may appear as one or more networks to the serviced systems and devices. In one embodiment, communications to and from the client devices 14A-N can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved with one or more wireless networks, such as, but are not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The intelligent search process 200 provides an intelligent search layer on top of mixed and unstructured databases or mixed structured data bases with different data models. This is referred to herein as "stagging," which is a short form for "smart tagging." Stagging includes any combination of (i) a data model suitable to combine several incompatible data models in a merged database, (ii) the creation of smart tags, i.e., stags by users (authors) of the system, (iii) a concept of organizing and linking stags to each other, (iv) design elements to visualize stag structures, (v) methods such as an interpretation engine to apply stags with current database technology, (vi) methods to improve existing data base software in order to accommodate stagging, and (vii) methods to share, rate, rank, and exchange stags in social networks. Stagging can be applied to improve search engines for the Internet, for searching scientific databases, as well as in applications in other industries.

Consider a user searching for assets of sports cars across multiple databases. Stagging enables the user to find Jaguars and Ferraris despite the fact that none of these assets was annotated with "sport" or "car." Consider a user searching for video assets with a certain minimal bit rate. Stagging enables the user to find the right assets in databases where the attribute was not called "bit rate" but "quality" or "resolution" and was not measured in megabit per second (mbps) but in gigabytes per hour (GB/h). Consider a user searching for images of a horse. Stagging enables the user to find images annotated in German, French, and Cantonese. Stagging gets smarter over time without the need to upgrade the software.

Figure 2:
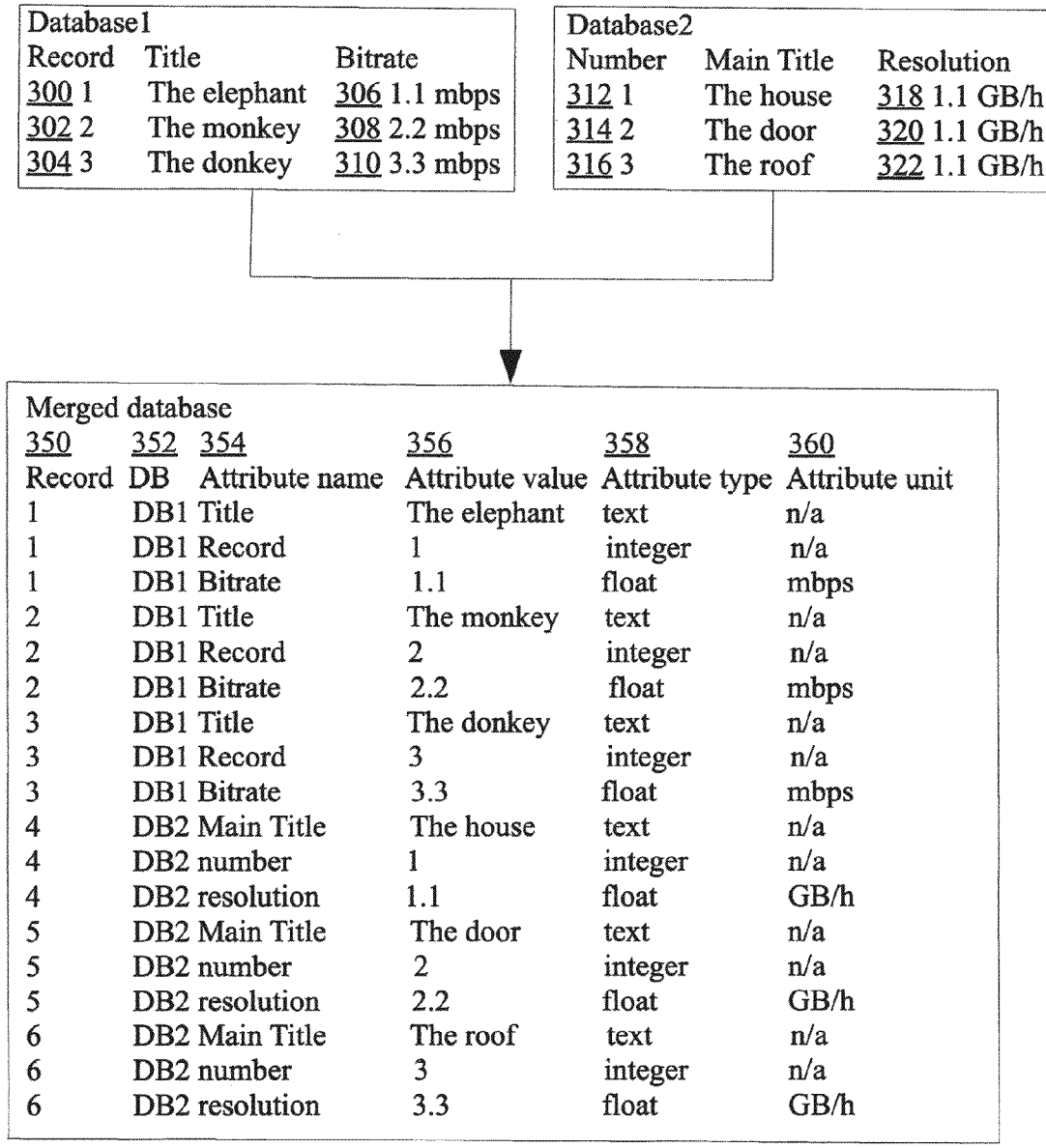
FIG. 2 is an exemplary merged database.

Since it is easier for the understanding of the stagging concept to work from such a merged database, the description herein will use a merged database. However, stagging can also be implemented on searching across multiple data bases in a federated search. By way of example, the invention is described in the context of the media industry. For search speed, it may be useful to combine the metadata of two databases with different data models into one data base. For this combination, attribute names, values, types and units can be stored for each attribute and record in the original database. The exemplary result of such a merged database is shown in FIG. 2. Here, a database1 includes three titles 300, 302, 304, with their respective bit rates 306, 308, 310. A database2 includes three main titles 312, 314, 316, with their respective resolutions 318, 320, 322. A merged database3 of database1 and database2 includes a record number 350, database identification 352, an attribute name 354, an attribute value 356, and attribute type 358 and an attribute unit 360.

Figure 3:
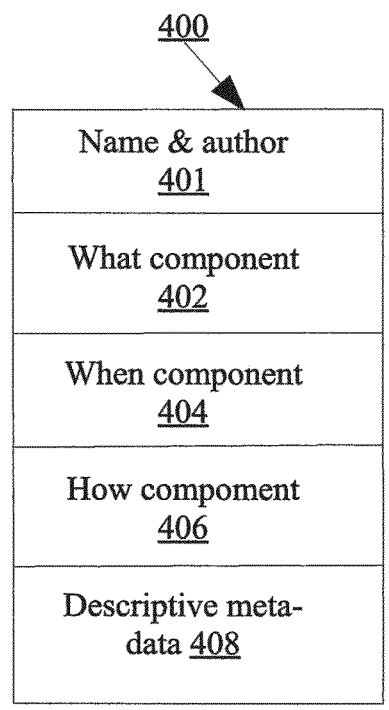
FIG. 3 is an exemplary stag.

As shown in FIG. 3, a what class stag 400 includes a name and author 401, at least one "what" component ("what") 402, no, a single or more "where" components ("where") 404, an equal number or a single "how" component ("how") 406, as well as descriptive metadata 408. The stag is a smart tag linking to other stags, or to metadata in a structured or unstructured database. As the stag 400 can not only refer to metadata but also to other stags, stags can represent hierarchies of stag references (i.e., hierarchical stags).

A where class stag does not contain any what components. It can be used to define more complex lists of locations or databases and may point to certain database fields. Where stags may refer to other where stags thus allowing the creation of complex hierarchical structures.

A how class stag may contain Boolean operators, formulas, or other methods of linking data. A how class stag may refer to several other how components thus allowing the generation of complex logics of linking data.

In a what class stag the what component 402 points to a combination of the attribute value, attribute type, and attribute unit (e.g., 3.3 GB/h). The where component 404 points to a location, i.e., a database, e.g. DB1, an attribute name (e.g., "main title"), or a combination thereof. The how component 406 contains a conversion logic. This conversion logic can be boolean logic for values, such as "equals," "less than," "greater than," and so forth. Stags furthermore contain qualifying and descriptive metadata. Descriptive metadata 408 can be used for ranking of stags and therefore search results. Example descriptive data 408 includes description, sensitivity, specificity, Google® index, Wikipedia® indices, and so forth. The stag 400 applies the conversion logic to metadata.

Figure 4:
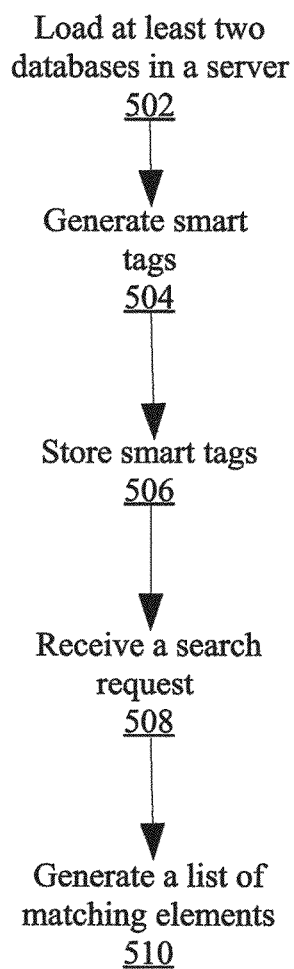
FIG. 4 is a flow diagram.

As shown in FIG. 4, the intelligent search process 200 includes loading (502) at least two databases in a server. For each element in each of the at least two databases, the intelligent search process 200 generates (504) a smart tag comprising a what component, a where component, a how component and descriptive metadata.

The intelligent search process 200 stores (506) each of the smart tags.

The intelligent search process 200 receives (508) a search request comprising one or more search terms.

The intelligent search process 200 generates (510) a list of elements from a match of the one or more search terms to one or more of the smart tags.

There are several different types of stags. For example, location stags, sometimes referred to as "where stags," are stags that help searching across different locations, e.g. different databases, attribute names, or combinations thereof. In simple cases these location stags work like mapping tables, but different to mapping tables where attribute names are changed, e.g. from "main Title" to "title," in order to match the destination data model a stag acts like an interpreter between one data model and the other.

The following is one example that illustrates the use of an attribute location stag. An example stag called "AllTitlesstag" can have the following components. Where1 is "DB1/Main title;" where2 is "DB2/Title," and how is "OR." If a user searches a merged database for all titles containing the word "donkey," i.e., AllTitlesstag CONTAINS "Donkey" a stagging interpreter converts the search into ((Main titlemeta CONTAINS "Donkey") AND (Database CONTAINS DB1)) OR ((Titlemeta CONTAINS "Donkey") AND (Database CONTAINS DB2)) and returns all matches in DB1 containing Donkey in Main title and all matches in DB2 containing Donkey in Title.

In the location stag, the reference to an attribute can be limited to only a particular database, to several databases, or to all databases.

Location stags or where stags can be hierarchical. In an example of a hierarchical stag, a "Descriptionstag" could link to AllTitlesstag and AllCommentsstag, as well as directly to a "Description" attribute. The referred stags (AllTitlesstag and AllCommentsstag) of course refer to either directly other attributes or again to other stags. With a simple search in the Descriptionstag, a user can search across dozens of attributes excluding hundreds or thousands of other attributes. With the stagging methodology, a searching user has a much simpler way of executing searches while conveniently being unaware of all the resulting complexity of the Boolean query expression.

Metadata stags, also referred to as what stags, can combine or connect metadata. They can be used in combination with other types of stags, as in the following example with a location stag. A metadata stag called "Mammalsstag" can have the following components. What1 is "Donkey," What2 is "Monkey," What3 is "Elephant," and How is "OR." If a user searches for (AllTitlesstag CONTAINS Mammalsstag), the stagging interpreter converts the search into (Main titlemeta CONTAINS ("Donkey" OR "Monkey" OR "Elephant") AND (Database CONTAINS DB1) OR (Titlemeta CONTAINS ("Donkey" OR "Monkey" OR "Elephant") AND (Database CONTAINS DB2)).

Non text metadata can be converted by the use of stags. The bit rate and resolution attribute in the example shown in FIG. 2 are essentially showing the same information—just in another unit. A stag can also be created to convert data from one unit to another. For example, a Non-text conversion stag called "Bitratestag" can have the following components. What1 is "Bitrate", Where1 is DB1, How1 is "Y=0.45*X," What2 is "Resolution", Where2 is DB2, and How1 is "Y=X." If a user searches a merged data base for (Bitratestag GREATER THAN 1.5), the stagging interpreter converts the search into ((Bitrate meta GREATER THAN "1.5") AND (Database EQUALS DB1)) OR ((Resolution meta GREATER THAN "0.45*1.5") AND (Database EQUALS DB2)).

What stags can be hierarchical, too, and can reference other what stags. A stag Animalsstag may, for example, combine the stags for Mammalsstag, Insectsstag, Fishstag, and Birdsstag. In this example, a hierarchical metadata stag called "Animalsstag" includes the following components. What1 is Mammalsstag, What2 is Insectsstag, What3 is Fishstag, What4 is Birdsstag and How is "OR." Clearly, the above example list concepts that looks similar to an ontological definition. In fact, existing ontologies can be imported or synchronized to stags.

The method described herein can use combination stags, sometimes referred to as "what and where stags." This enables stags to be used to search for certain metadata only in certain locations. This functionality can be used to e.g. search across databases with different languages. The following example extends the Mammalsstag to also search for German Mammals in a database called DB5. The Mammalsstag can include What1 is "Donkey," Where1 is DB1;DB2, What2 is "Monkey," Where2 is DB1;DB2, What3 is "Elephant," Where3 is DB1;DB2, What4 is "Esel," Where4 is DB5, What5 is "Affe," Where5 is DB5, What6 is "Elefant," Where6 is DB5, and How is "OR." If a user searches the merged data base for (AllTitlesstag CONTAINS Mammalsstag), the stagging interpreter converts the search into ((Main titlemeta CONTAINS "Donkey" OR "Monkey" OR "Elephant") AND (Database CONTAINS DB1)) OR ((Titlemeta CONTAINS "Donkey" OR "Monkey" OR "Elephant") AND (Database CONTAINS DB2)) OR ((Haupttitelmeta CONTAINS "Esel" OR "Affe" OR "Elefant") AND (Database CONTAINS DB5)). This example demonstrates that the stag interpretation can turn complex searches into very simple ones since once stags are created they can be stored and reused.

Stagging enables combining metadata generated automatically with other metadata and smarter logic and makes use of such automatically generated meta data.

"Staggering," as used herein, refers to sharing stags. Stags can be used in social networks in an uncontrolled manner and/or published and altered in a Wikipedia-like self editing organization. Users can vote for certain stags and for certain users that created high quality stags. Users can subscribe to stags from certain users; if these improve their stags the next search of those users who have subscribed to those stags will reveal a different result. Eventually, the borders between "real" metadata and stags blur as users are searching for terms and are not aware of the fact that they are searching for stags.

Figure 5:
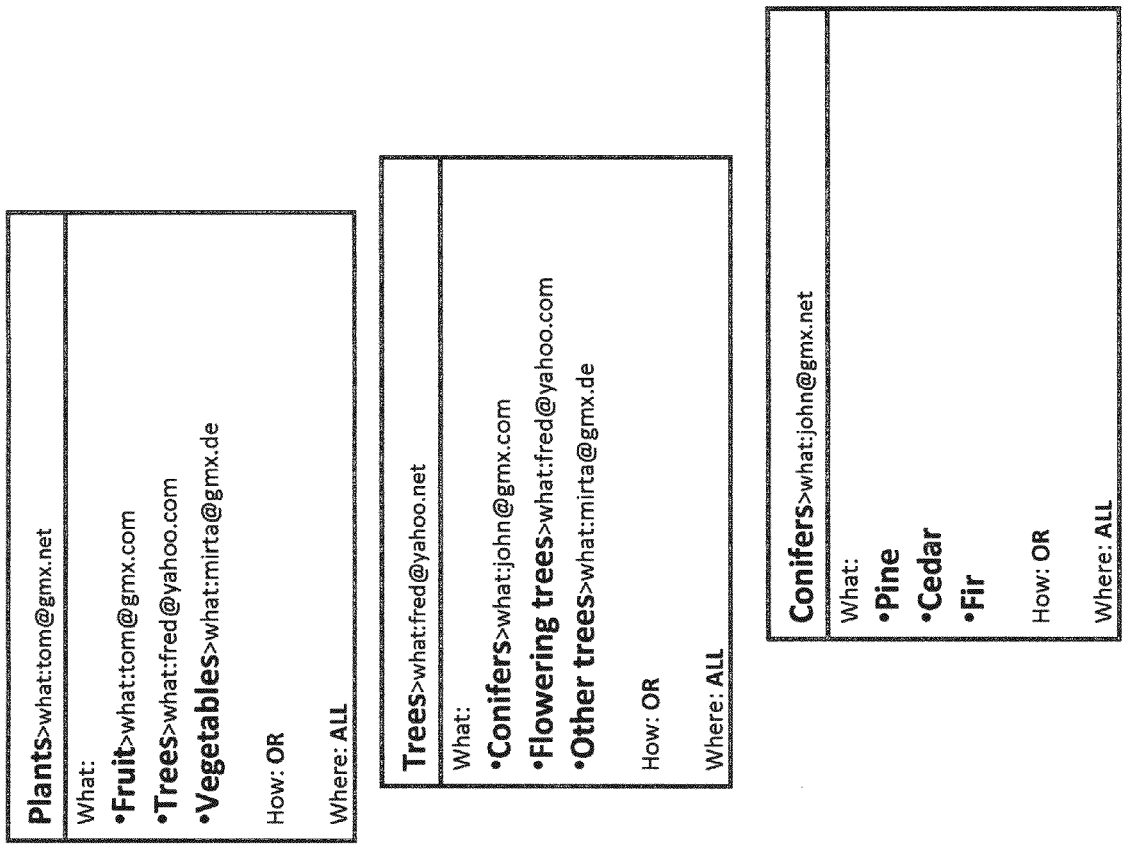
FIG. 5 is an exemplary diagram illustrating a hierarchical structure of what stags.

FIG. 5 is a diagram illustrating the hierarchical structure of what stags. The stag "plants" from the author tom@gmx.net refers to three other stags, one of those being the stag trees from the author fred@yahoo.com. The trees stag refers to another three stags, one of which is the conifer stag from the author john@gmx.net. The conifer stag does not refer to other stags but rather contains the English names of three trees. A user who searches for plants and uses Tom's plant stag will retrieve hits for pines, cedars, and firs. If John modifies his conifer stag and the user searches again for plants, this time the search results will reflect John's changes.

Figure 6:
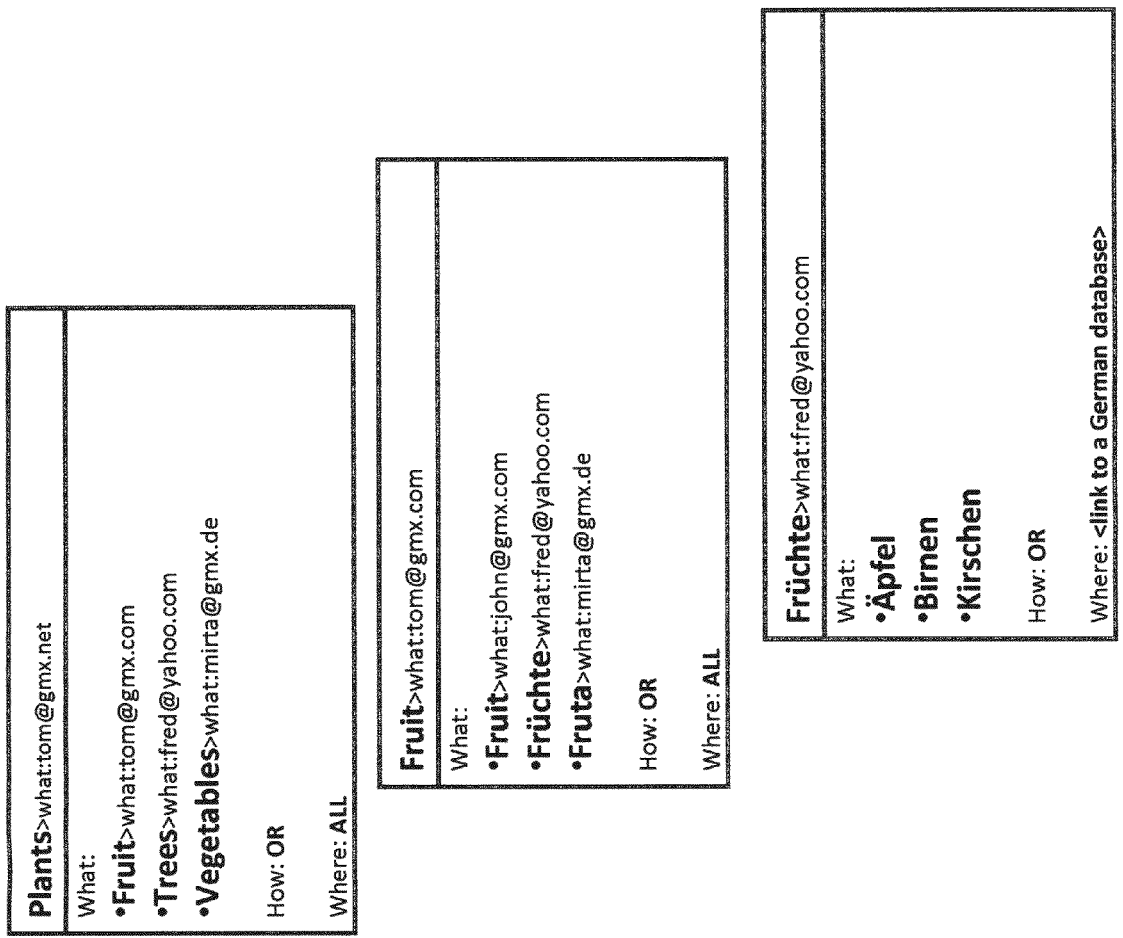
FIG. 6 is an exemplary diagram illustrating the use of a where component in stags.

FIG. 6 is a diagram illustrating the use of a where component in stags. It could be applied e.g. for searches on images in databases with metadata in different languages. If a user is searching for plant images he would find images of a German database tagged with e.g. the term Äpfel (i.e., German for apples).

Figure 7:
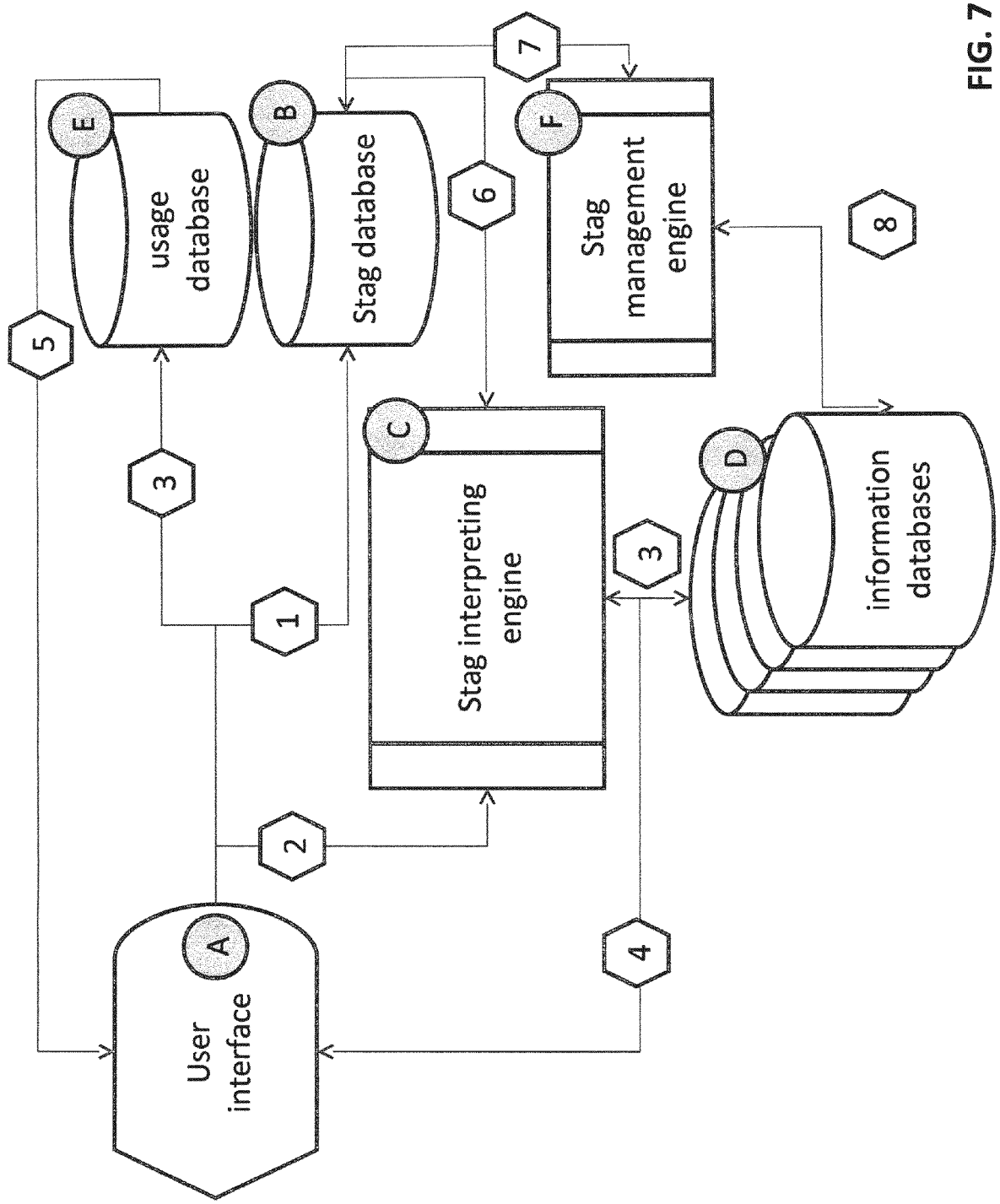
FIG. 7 is an exemplary flow diagram illustrating the key components of the present invention.

FIG. 7 is a flow diagram illustrating the key components of the system. A user #1 can create a stag (e.g. the above mentioned plants stag) in the user interface (A). The stag will be stored (1) in the stag database (B) with him as the author. Another user #2 may search in the user interface (A) for plants and select the plant stag of user #1. This triggers via (2) the interpretation engine (C) to convert the hierarchical stag structure into a complex search and execute the search call (3) to the databases (D). The returned data records will then be sent (4) to the user interface (A). The usage of the stag will be recorded (5) in the usage database (E). From time to time the stag management engine (F) will create queries (8) in databases (E) in order to create e.g. sensitivity and specificity data about stags and store these (7) in the stag database (B).

Figure 8:
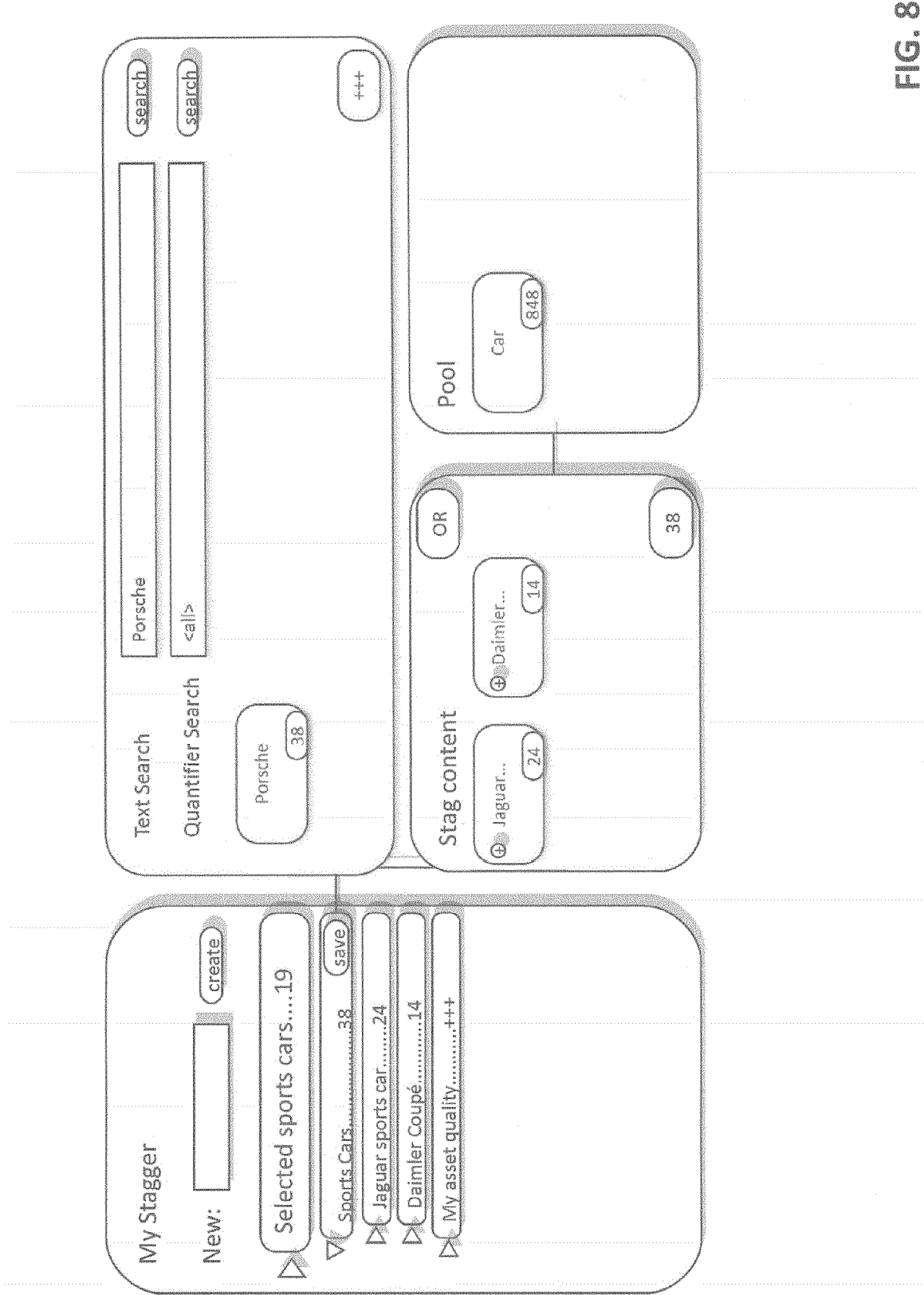
FIG. 8 is an exemplary user interface.

FIG. 8 is an illustration of the user interface that enables the user to search, create and adapt stags. The left hand side (the "stagger") shows the hierarchical structure of the search "selected sports cars" which is referring to the stags "sports cars" and "my asset quality". "Sports cars" itself is a stag consisting of the stags "Jaguar sports cars" and "Daimler coupé". In the illustration the user has selected the "sports cars" stag in the stagger window, thus showing the construction of the stag in the stag content window. The user is searching for "Porsche" and has found a Porsche stag. By dragging and dropping the Porsche stag into the stag content window he can add the Porsche stag as a what component to the "sports cars" stag thus refining his search. The pool window on the right hand side shows related stags. In the upper right hand corner of the stag window the selected how component (OR) is shown. The where component is not shown in this user interface.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A method comprising:
   in a network of interconnected computers, loading at least two databases in a server, a first database comprising a plurality of smart tags, referred to as stags, and usage data and one or more databases comprising searchable content, enabling a user to generate one or more searches using the stags, each of the stags comprising at least a unique identifier and/or a name and author, one or more what components, an equal number of or a single or no where component, a single how component ("what stag"), several where components and an equal number of or a single how component ("where stag"), or several how components that are linked with another how component ("how stag"), and descriptive metadata and usage data; wherein each what component comprises either a keyword or a reference to another what stag, each where component comprises either a location or a reference to another where stag, and each how component could comprise either a logic or a reference to another how stag;

converting the stags with an interpreting engine into a search query;

managing with a stag management engine the stag and usage data that are stored in the stag and usage database;

generating data from third party databases to rank stags in a graphical user interface; and generating a list of matching results of database records and stags depending on a user selection.

2. The method of claim 1 wherein each what component comprises a combination of an attribute value, an attribute type, and an attribute unit of the element.

3. The method of claim 1 wherein the where component comprises one or more location pointers to a database and/or a Universal Resource Locator (URL).

4. The method of claim 3 wherein the where component further comprises, for each location pointer, a sub-location that is an attribute name of the element, or a frame or similar segment of a URL.

5. The method claim 1 wherein if the where components are absent the search is executed with no location restriction.

6. The method of claim 1 wherein the where component is a single where component resulting in the stag referring to such location.

7. The method of claim 1 further comprising several where components resulting in the stag referring to all such locations, or, upon selection by the user, if there are an equal number of what and where components, the first what component refer to the first where component, and so on; and
   if containing an equal number of how components using these how components for conversion in such a way that the first how component is used to convert the first what component in the first location, and so on.

8. The method of claim 1 wherein the how component comprises one or several elements of a conversion logic or a heuristic method.

9. The method of claim 1 wherein the descriptive metadata comprises data selected from the group consisting of short name, long name, description, definition, author, usage data, sensitivity indices, and specificity indices.

10. The method of claim 1 wherein the graphical user interface comprises a graphical stag content area into which symbols representing what stags are placed by a user gesture such as drag and drop, thus generating a new stag with those stags being what components of the new stag, and wherein the how and where components can be selected.

11. The method of claim 1 wherein the graphical user interface comprises a graphical area into which symbols representing where stags are placed by a user gesture such as drag and drop, thus generating a new stag with those stags are where components of the new stag.

12. The method of claim 1 wherein the graphical user interface comprises a the stagger window consisting of a tree structure depicting a hierarchy of stags in which the user can select a stag for review or editing.

13. The method of claim 1 wherein the usage data and user voting data of each stag are used for ranking or filtering of displayed stags.

14. The method of claim 1 further comprising enabling the user to include stags and/or exclude non-stags (keywords) as search results and to use collected data as per claims to restrict or broaden stag results lists.

15. The method of claim 1 further comprising enabling the user to subscribe to a stag of another user and hence to receive updates to the subscribed stags from the author of the stag.

16. The method of claim 1 wherein the usage data is selected from the group consisting of subscription data and alteration data, the subscription data and alteration data used for ranking and/or filtering of displayed stags.

17. The method of claim 1 wherein the stag management engine queries a name of a stag or other stag information with search engines, records a number of hits and a number of appearances of the search term on a result page and generates indices describing a sensitivity and/or specificity of the stag.

18. The method of claim 1 wherein the stag management engine queries a name of a stag or other stag information with encyclopedias, records a number of entries or a number of words in an entry, and generates indices describing a specificity and relevance of the stag.

19. The method of claim 1 wherein the stag management engine evaluates an author of a stag's competence in a certain domain and uses such competence information to enable ranking of such author's stags in certain domains.

20. The method of claim 1 wherein information about the stags is imported information from semantic networks, ontologies, expert systems, or other resources.

* * * * *